US012293387B2

(12) United States Patent
Miyoshi et al.

(10) Patent No.: US 12,293,387 B2
(45) Date of Patent: May 6, 2025

(54) INFORMATION PROCESSING DEVICE AND INFORMATION PROCESSING METHOD

(71) Applicant: Nissan Motor Co., Ltd., Kanagawa (JP)

(72) Inventors: Takehiro Miyoshi, Kanagawa (JP); Kotaro Chiba, Kanagawa (JP); Xiaoxiao Fei, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 18/556,809

(22) PCT Filed: Apr. 28, 2021

(86) PCT No.: PCT/JP2021/017043
§ 371 (c)(1),
(2) Date: Oct. 23, 2023

(87) PCT Pub. No.: WO2022/230130
PCT Pub. Date: Nov. 3, 2022

(65) Prior Publication Data
US 2024/0202778 A1 Jun. 20, 2024

(51) Int. Cl.
*G06Q 30/02* (2023.01)
*G06Q 30/0251* (2023.01)

(52) U.S. Cl.
CPC ................ *G06Q 30/0257* (2013.01)

(58) Field of Classification Search
CPC ............. G06Q 30/0257; G06Q 50/10; G06Q 30/0207–30/0277
See application file for complete search history.

(56) References Cited

U.S. PATENT DOCUMENTS

| 7,305,350 B1 * | 12/2007 | Bruecken | ............... | G06Q 10/08 |
| | | | | 705/26.1 |
| 8,630,897 B1 * | 1/2014 | Prada Gomez | ........ | G08G 1/202 |
| | | | | 705/14.57 |

(Continued)

FOREIGN PATENT DOCUMENTS

| JP | 2002247635 A | 8/2002 |
| JP | 2004280468 A | 10/2004 |

(Continued)

*Primary Examiner* — Thuy N Nguyen
(74) *Attorney, Agent, or Firm* — Osha Bergman Watanabe & Burton LLP

(57) ABSTRACT

An information processing device includes a database, an acquisition unit, a specification unit, a movement plan unit, and a transmission unit. The database stores providers providing a user with experiences and provision places where the providers allow providing the experiences while associating one another. The acquisition unit is configured to acquire experience desire data relating to an experience that the user desires. The specification unit is configured to specify, based on the data stored in the database and the experience desire data, an experience provider being a provider capable of providing the experience that the user desires and the provision place. The movement plan unit is configured to specify the provision place specified by the specification unit as a destination of the user, and generate a movement plan for the user to move to the destination. The transmission unit is configured to transmit, to the experience provider, a notification signal notifying that the experience is desired to be provided at the destination indicated in the movement plan. The specification unit configured to generate customer data including information of a plurality of the users who have desires the same experience and aggregate to the destination. The transmission unit configured to transmit, to the experience provider, the notification signal including the customer data.

13 Claims, 6 Drawing Sheets

(56) References Cited

U.S. PATENT DOCUMENTS

| | | | |
|---|---|---|---|
| 8,898,288 B2* | 11/2014 | Petersen | H04L 51/222 709/224 |
| 10,508,924 B2* | 12/2019 | Ikavalko | G01C 21/3492 |
| 10,921,147 B1* | 2/2021 | Hapgood | G01C 21/3484 |
| 10,970,668 B2* | 4/2021 | Han | G08G 1/202 |
| 2003/0061109 A1* | 3/2003 | Banerjee | G06Q 30/0281 705/346 |
| 2012/0209673 A1* | 8/2012 | Park | G06Q 30/02 705/14.15 |
| 2014/0006096 A1* | 1/2014 | Groarke | G06Q 30/02 705/7.29 |
| 2015/0006005 A1* | 1/2015 | Yu | G05D 1/667 701/22 |
| 2015/0095198 A1* | 4/2015 | Eramian | G06Q 30/0629 705/26.64 |
| 2015/0178691 A1* | 6/2015 | Lineberger | G06Q 30/0251 705/7.19 |
| 2016/0162936 A1* | 6/2016 | Khalil | G06Q 30/0261 705/14.52 |
| 2016/0189436 A1* | 6/2016 | York | G06Q 10/00 705/13 |
| 2016/0267537 A1* | 9/2016 | Runyan | G06Q 50/01 |
| 2018/0084079 A1* | 3/2018 | Williams | H04W 4/00 |
| 2018/0293573 A1* | 10/2018 | Ortiz | G06Q 20/102 |
| 2018/0357668 A1 | 12/2018 | Kanemoto et al. | |
| 2019/0086224 A1* | 3/2019 | Sharma | G08G 1/0125 |
| 2019/0102845 A1* | 4/2019 | Bui | G06Q 30/0259 |
| 2020/0020021 A1 | 1/2020 | Nishimura | |
| 2020/0090190 A1* | 3/2020 | Misaki | G06Q 30/0242 |
| 2020/0160268 A1* | 5/2020 | Han | G06N 3/084 |
| 2020/0258123 A1* | 8/2020 | Kobayashi | G06Q 30/0207 |
| 2020/0279339 A1* | 9/2020 | Akutagawa | G06F 16/90324 |
| 2021/0256549 A1* | 8/2021 | Ren | G06N 20/00 |
| 2021/0287319 A1* | 9/2021 | Lutnick | G06Q 30/0635 |
| 2022/0036396 A1* | 2/2022 | Calvert | G06Q 20/387 |
| 2023/0194272 A1* | 6/2023 | Kubo | G01C 21/3438 705/14.11 |

FOREIGN PATENT DOCUMENTS

| | | |
|---|---|---|
| JP | 2005114566 A | 4/2005 |
| JP | 2013096923 A | 5/2013 |
| JP | 2020009298 A | 1/2020 |
| WO | 2017098803 A1 | 6/2017 |

\* cited by examiner

Fig. 2

USER TABLE

| | User attributes | | | User input items | | | | |
|---|---|---|---|---|---|---|---|---|
| Name | Gender | Age | Preferences | Desired content | User location | Desired experience time zone | Number of persons | Budget |
| A | Female | 20s | Likes spicy food | Desires to eat pasta and ice cream | City p | 11:00 - 13:00 | 3 persons | Up to 2,000 yen |
| B | Female | 20s | Likes sweets | Desires to eat ice cream | City q | 15:00 - 16:00 | 2 persons | Up to 1,000 yen |
| C | Male | 20s | Likes large servings | Desires to eat chinese food | City p | 13:00 - 14:00 | 4 persons | Up to 4,000 yen |
| D | Female | 30s | Likes P | Desires to eat pasta | City q | 12:00 - 13:00 | 5 persons | Up to 3,000 yen |
| E | Male | 30s | Likes Q | Desires to eat X | City r | 11:00 - 11:30 | 3 persons | Up to 3,000 yen |

Fig. 3

PROVIDER TABLE

| Provider | Genre | Main menu | Target customers | Price range | Product serviceable Hub | Available time zone | Supply style |
|---|---|---|---|---|---|---|---|
| Store 1 | Italian food | Pasta and pizza | 20-30s Female | 1000 - 2000 yen | a,b,c | 10:00 - 18:00 | Home delivery |
| Store 2 | Dessert | Ice cream | 10-30s Female | 300 - 1000 yen | a,b | 15:00 - 16:00 | Mobile store |
| Store 3 | French food | French food in general | 30-50s Female | 1000 - 2000 yen | c,d | 12:00 - 18:00 | Home delivery |
| Store 4 | Japanese food | Sushi | 30-50s Male | 2000 - 4000 yen | a,b,c | 13:00 - 19:00 | Home delivery |
| Store 5 | Chinese food | Chinese food in general | 20-50s Male | 700-1500 yen | d,e | 11:00 - 20:00 | Home delivery |

Fig. 6

| Hub | Customer data | | | | | |
|---|---|---|---|---|---|---|
| | Number of users | Age and gender of users | Time of stay of users | Preferences of main user | Desired product | Budget of main user |
| a | 10-20 persons | 20-30s Female | 11:00 - 14:00 | Likes spicy food | Pasta and Ice cream | 1000 - 2000 yen |

INFORMATION PROCESSING DEVICE AND INFORMATION PROCESSING METHOD

TECHNICAL FIELD

The present invention relates to an information processing device and an information processing method.

BACKGROUND ART

Advertisement distribution systems that distribute advertisement information for filling vacant seats in stores are known. For example, the advertisement distribution system disclosed in Patent Literature 1 predicts customer seat conditions such as hourly changes in utilization rate of customer seats and distributes advertisement information to prospective customers who can visit around the time when the customer seat become vacant. When customer seats are already vacant, by offering more advantageous discount rates and coupons to prospective customers with short movement time to the store, the customer seats can be quickly filled and the utilization rate of customer seats can be recovered in a short time. On the other hand, prospective customers who will arrive after the time at which vacant seats are expected to be available do not contribute to the recovery of the utilization rate of customer seats, and therefore disadvantageous offers are made.

PRIOR ART DOCUMENT

Patent Document

Patent Document 1: WO2017/098803

SUMMARY OF INVENTION

Problems to be Solved by Invention

However, since the above-described advertisement distribution system is a system that recovers the utilization rate of customer seats in a store, there is a problem that the store cannot provide users with experiences unless the users visit the store.

The problem to be solved by the present invention is to realize information processing for providing an experience desired by a user at a place other than a store.

Means for Solving Problems

The present invention solves the above problem by: acquiring data from a database that stores providers providing users with experiences and provision places where the providers allow providing the experiences while associating one another; specifying, based on the data acquired from the database and experience desire data, an experience provider being a provider capable of providing the experience that a user desires and a provision place; specifying the specified provision place as a destination of the user; generating a movement plan for the user to move to the destination; and transmitting, to the experience provider, a notification signal notifying that the user desires the experience to be provided at the destination indicated in the movement plan.

Effects of Invention

According to the present invention, it is possible to provide an experience desired by a user at a destination that is a place other than a store.

BRIEF DESCRIPTION OF DRAWINGS

FIG. 2 is a diagram illustrating an example of a user table stored is a database of FIG. 1.

FIG. 3 is a diagram illustrating an example of a table of provider data stored in the database of FIG. 1.

FIG. 6 is a diagram illustrating an example of customer data generated by a provider specification unit of FIG. 1.

MODE(S) FOR CARRYING OUT THE INVENTION

Figure 1:
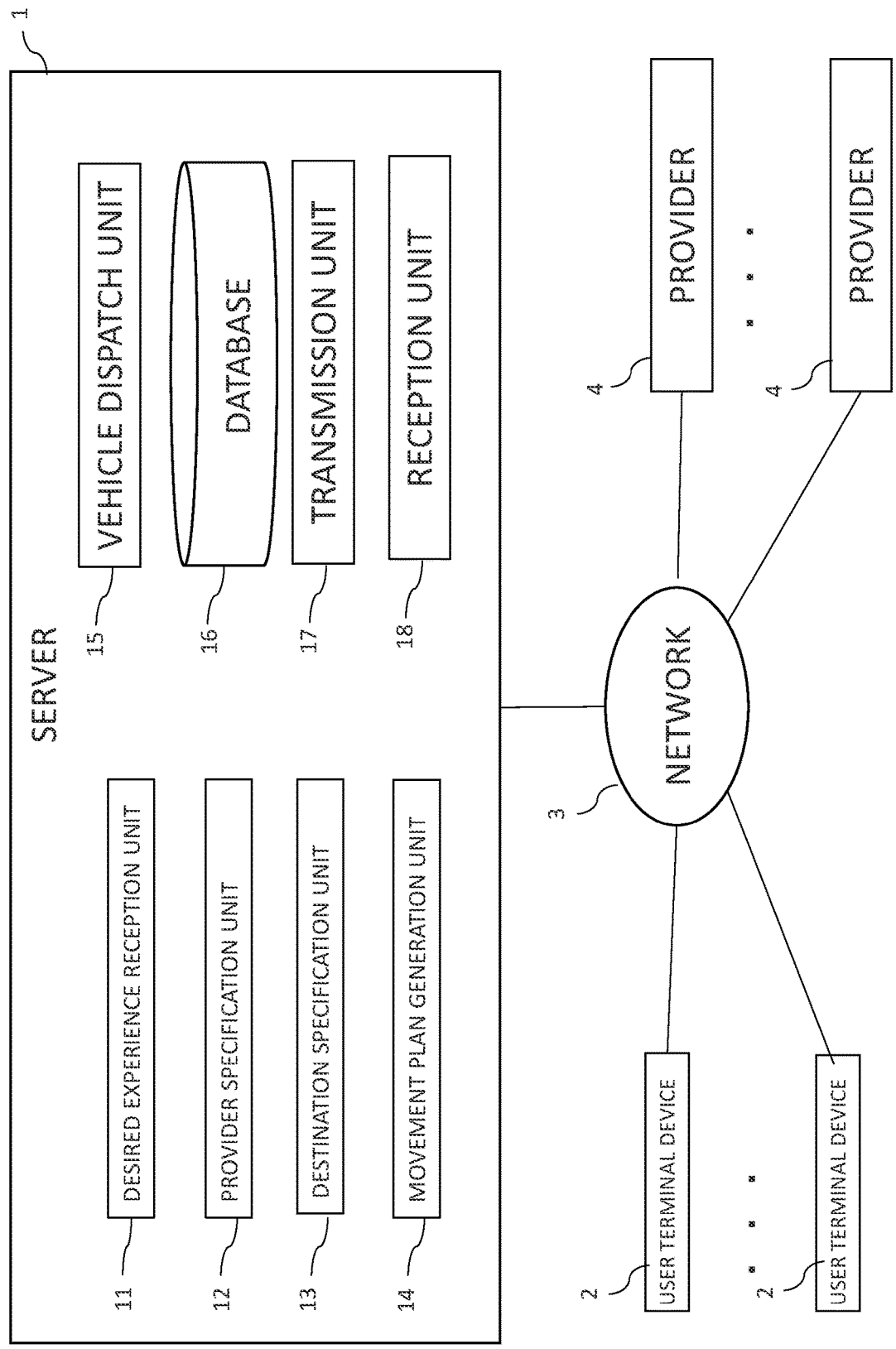
FIG. 1 is a block diagram illustrating an embodiment of an information processing system according to the present invention.

Hereinafter, an embodiment of an information processing system according to the present invention will be described with reference to the attached drawings. FIG. 1 is a block diagram illustrating an information processing system according to an embodiment of the present invention. The system of the present embodiment includes a server 1, a plurality of user's terminal devices 2, a network 3 configuring a telecommunications network, and one or a plurality of providers 4. When specifying a user's destination, the system of the present embodiment avoids a place with a high degree of congestion, such as a downtown terminal and main stations, and specifies as a destination a place where an experience desired by a user can be provided, which is a place other than a store. Then, the information processing system notifies the experience provider that there is a user who desires to be provided with the experience at the specified destination.

Although not particularly limited, in order to facilitate understanding of the present invention, an example is given as follows. When a user wants to have a specific experience such as eating pasta, bathing in a hot spring, or buying a book, it is conventionally general that the user uses a terminal device such as a smartphone to search for a facility or store capable of providing the experience, and then the user visits the store directly and enjoys the experience. Further, in the case of searching for stores using a conventional gourmet website, even if places and store names are displayed, stores cannot provide users with experiences such as products or services unless the users visit the stores. Therefore, providers such as stores providing experiences set up stores in people gathering congested places such as downtown terminals and main stations. As a result, stores concentrate in congested places, and traffic concentration occurs around the congested places. The system of the present embodiment specifies places other than stores, places where experiences desired by users can be provided, places serving as user's destinations, while avoiding people gathering congested places. Further, the system of the present embodiment transmits, to multiple experience providers, information about places where users who desire experiences gather, that is, destinations of multiple users, and information about gathering users. This makes it possible to aggregate people and provide multiple experiences at aggregate places, while avoiding places with high degree of congestion. As a result, it is possible to create places where people gather at places other than people gathering congested places such as downtown terminals and main stations. Further, it is possible to activate stores and the like located around the aggregate places.

The "desired experience" according to the present embodiment means a matter that each user wants to experience, and is an experience of "desiring to eat", especially "desiring to eat pasta" or "desiring to eat ice cream", in the above-described example. In addition to this type of experience of desiring to eat, there are other genres of service such as desiring to shop, desiring to play sports, and desiring to bathe in a hot spring. The system of the present embodiment includes such a variety of experiences. In other words, the experiences desired by users include purchase of products by the users and/or services experienced by the users.

The server 1 of the present embodiment is configured by a computer including hardware and software, and includes a ROM storing programs, a CPU executing the programs stored in the ROM, and a RAM that functions as an accessible storage device. As an operating circuit, the CPU may be replaced by or used together with MPU, DSP, ASIC, FPGA, or the like. Further, as illustrated in FIG. 1, a desired experience reception unit 11, a provider specification unit 12, a destination specification unit 13, a movement plan generation unit 14, a vehicle dispatch unit 15 realize each function described below by the software established in the ROM. Further, the server 1 includes a database 16, as a storage unit. While using information stored in the database 16, the desired experience reception unit 11, the provider specification unit 12, the destination specification unit 13, and the movement plan generation unit 14, and the vehicle dispatch unit 15 described above realize each function described below. Further, the server 1 includes a transmission unit 17 and a reception unit 18 configured to transmit and receive data including information processed by various functions and the information stored in the database 16 to the terminal devices 2 and the providers 4.

As a premise of the system of the present embodiment, multiple persons who can be users own their terminal devices 2 that are carried or used on a daily basis. Smartphones, mobile telephones, and portable computers can be used as this kind of terminal devices 2. The terminal device 2 of the present embodiment has computer functions, and includes an input unit for inputting data, a communication function for transmitting the input data to the server 1, a location detection function such as a GPS receiver that detects the current location of the terminal device 2, and a display function for displaying data transmitted from the server 1 on its display. Each terminal device 2 transmits its own ID, current location, and input data to the server 1 via the Internet or another network 3 (wireless communication network).

The provider 4 provides a user with an experience at a provision place of a product and/or service specified by the server 1. The provider 4 is a store having a physical store, a business operator providing products/services with a moving vehicle without any physical store, a business operator providing only products for home delivery using only a cooking place, a business operator providing no product but setting up a facility for providing products/services at a predetermined place, or the like. The provider 4 provides products/services at a place specified by the server based on information provided by the server 1.

Next, the configuration of the server 1 will be described. The desired experience reception unit 11 receives, via the network 3, information transmitted from the terminal devices 2 carried by multiple users. FIG. 2 illustrates experience desire data acquired by the desired experience reception unit 11. The experience desire data includes information about the experience desired by users, and is categorized into user attribute and user input items. The user attributes are determined by information entered by users at the time of initial registration for using services in this system. As illustrated in FIG. 2, the user attributes include personal information such as name, gender, and age, and preferences indicating user preferences. For example, User A is "female" in gender, "twenties" in age, and "likes spicy food" in preferences.

When using the services in this system, users input at least information about desired experience content. For example, if the desired experience relates to eating and drinking, the experience content information to be input may be food name such as "pasta" or "ice cream", or genre of food such as "Chines food" or "Japanese food". That is, the input of experience information is not limited to specific names such as product names and service names, and may be vague information. Further, user's input items include, as information relating to the desired experience, user's current location, desired experience time zone, number of persons, budget, and the like. The user's location corresponds to locational information that can be detected by the location detection function such as the GPS receiver of the terminal devices 2. The user's location is not limited to the current location of the terminal device 2, and may be a location input by the user. For example, when the user stops at a destination proposed by the destination specification unit 13 described below and then moves to another place, the latter place may be designated as the user's location.

The desired experience time zone is the time period during which the user can have the experience at the destination. For example, in the example of FIG. 2, User A expresses that she wants to have the experience between 11:00 to 13:00. The number of persons is the number of persons including the user. In the example of FIG. 2, User A desires an experience with three persons including the user. The budget is the desired expense for having the experience.

The desired experience reception unit 11 acquires the experience desire data from the terminal devices 2 via the network 3, and causes the database 16 to store the acquired experience desire data. The database 16 stores the experience desire data of each user, as a table as illustrated in FIG. 2.

The provider specification unit 12 refers to the data stored in the database 16, and specifies a provider that provides a user with an experience. The database 16 stores store or facility information, as provider data, for having services in this system. FIG. 3 is a table for the provider data that includes providers stored in the database 16 and locational information of "hubs" that can be user's destinations. The provider data includes information about the content of providable experiences and places where the experiences can be provided. The provider data is determined by the information entered by users at the time of initial registration for using services in this system. The users are mainly business operators that can provide the experiences. As illustrated in FIG. 3, the provider data includes information such as provider's store name, genre, main menu, target customers, price range, available time zone, and supply style. For example, the store named "Store 1" provides Italian products, with pasta and pizza as main menu. The main target customers visiting "Store 1" is in their twenties and thirties. The price range corresponding to the average unit price per customer is 1000 to 2000 yen. These kinds of information may be input by business operators at the time of initial registration, or may be extracted from store's performance data, word-of-mouth communication information on gourmet websites, etc. and stored in the database 16.

A "product serviceable hub" included in a provider table represents a provision place where the experience can be provided in this system, and is location data of a "hub" that can be a user's destination. The destination is a place other than people gathering congested places such as downtown terminals and main stations, and is a place where a user who desires the experience is connected to a provider that provides the experience. In the present embodiment, since the destination serving as an experience provision place is the place for connecting the user desires the experience to the provider, this place may be referred to as a hub. Places that can serve as hubs are determined in advance. The destination specification unit 13 described below specifies a destination suitable for each user from among "product serviceable hubs". That is, "product serviceable hub" data is information on provision places where providers can provide experiences, and corresponds to information on locations that can be user's destinations. The provider table stores providers and provision places in association with each other.

In the example of FIG. 3, the provider of "Store 1" can provide products at hubs a, b, and c. Hubs a, b, and c serve as provision places where products can be provided by "Store 1". The product serviceable hubs are determined by the input at the time of initial registration. Alternatively, places located in a predetermined range from the location of Store 1 may be regarded as hubs. The supply style is a style for providing products or services to be experienced. For example, in the example of FIG. 3, the supply style of "Store 1" is "home delivery", and is a style using the home delivery service to deliver the product made at the store to the product provision place (hub). Further, in the example of FIG. 3, the supply style of "Store 2" is "mobile store", according to which a vehicle mounting the entire store or a part of store's functions moves to the hub and the vehicle is used as the store that provides products. The mobile stores are not always required to use vehicles to move. For example, it may be possible to install a facility required to provide experiences in a hub and use this facility for providing the experiences.

The provider specification unit 12 specifies experience content of a user who desires an experience from the experience desire data acquired by the desired experience reception unit 11, and specifies a provider capable of providing the specified experience. When User A shown in FIG. 2 applies to this system and expresses user's desire to experience, the provider specification unit 12 extracts information about User A from the user table stored in the database 16 and specifies the experience content that User A desires. Since User A desires an experience of "eating pasta, and eating ice cream", the provider specification unit 12 specifies providers that can provide "pasta" and "ice cream". In the example of FIG. 3, Store 1 can provide "pasta" and Store 2 can provide "ice cream". Therefore, the provider specification unit 12 specifies Store 1 and Store 2 as experience providers. The experience provider indicates a provider capable of providing the experience desired by the user at the destination. As illustrated in FIG. 3, product serviceable hubs (corresponding to product serviceable places) of Store 1 are "a, b, and c", and product serviceable hubs of Store 2 are "a and b". The common hubs "a and b" are regarded as hubs capable of providing User A with the desired experience, and are regarded as destination candidates for User A.

The method in the above description is specifying providers in consideration of the content of the experience desired by the user. However, not only the experience content but also information about the desired experience time zone, the number of persons, the budget, and the like may be taken into consideration in specifying providers. In the example of FIGS. 2 and 3, User B "wants to eat ice cream" and therefore desires an experience of eating "ice cream". Store B can be a candidate for the experience provider in view of the experience content because ice cream is included in the main menu. However, the available time zone of Store 2 is in the range from 15:00 to 16:00, which is out of the desired experience time zone (13:00 to 15:00) of User B. Therefore, Store 2 is not specified as the experience provider.

Figure 4:
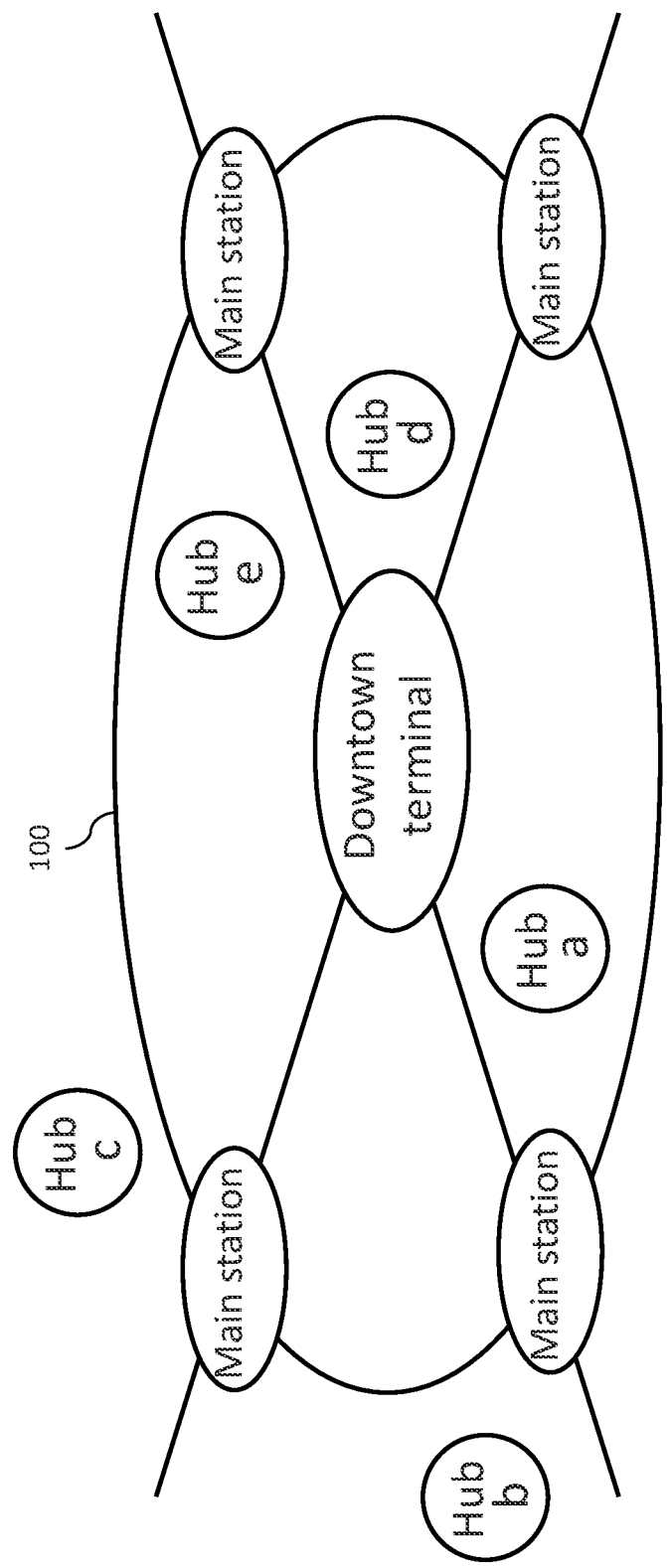
FIG. 4 is a conceptual diagram for explaining a locational relationship between destination (hubs) specified by a destination specification unit of FIG. 1, a downtown terminal, and main stations.

The destination specification unit 13 specifies a user's destination, which serves as a place for providing the experience. The destination will now be described with reference to FIG. 4. FIG. 4 illustrates a locational relationship between a downtown terminal, main stations, and hubs. As illustrated in FIG. 4, in the city center, a traffic network 100 connecting each main station is formed with the downtown terminal centered. The traffic network 100 includes railroads, general roads, highways, and the like. In the vicinity of the downtown terminal and the main stations, stations, stores, and the like are densely located, resulting in traffic concentration around them. Further, in the vicinity of the downtown terminal and the main stations, there are many stores thriving with a large number of customers. On the other hand, stores located far from the downtown terminal and the main stations may be deserted. Under such an environment, there is a need to alleviate the traffic concentration in the vicinity of the downtown terminal and the main stations, and also there is a need to cause customers to visit the places away from the downtown terminal and the main stations. In order to satisfy these two needs, this system sets destinations serving as experience provision places at places away from the downtown terminal and the main stations. Users move toward the destinations having been set, and stores provide products and services at the destinations. In the example of FIG. 4, as the places away from the downtown terminal and the main stations, hubs a to e are set. A user's destination being a place where the experience is provided is specified from among the hubs a to e. The hubs a to e are places such as parks each having a relatively large space.

The destination specification unit 13 calculates the degree of congestion around the hubs a to e. The degree of congestion can be calculated using information (traffic density) in traffic communication systems such as JARTIC and VICS (registered trademark), information in private-sector locational information management systems, and information used in social networks such as SNS. For example, as an example of using information in private-sector locational information management systems, the degree of congestion can be calculated from the locational information of terminal devices such as smartphones. Further, as an example of using information used in social networks such as SNS, a place with a large number of posts such as SNS and word-of-mouth communications is expected to be crowded, but a place with a small number of posts is not expected to be crowded. That is, in the calculation, the larger the number of posts, the higher the degree of congestion. Further, the degree of congestion is not limited to information managed in real time by systems, and the degree of congestion may be calculated from geographical conditions. In general, the degree of congestion decreases with increasing distance from people gathering places such as downtown terminals, main stations, or busy districts. Therefore, people gathering places are specified in advance from map information, and the degree of congestion is calculated so that the degree of congestion decreases with increasing distance from people gathering places to hubs. The distance may be replaced by time.

The destination specification unit 13 calculates the degree of congestion around the hubs a to e, and compares the calculated degree of congestion with a predetermined threshold for the degree of congestion. The threshold for the degree of congestion indicates an upper limit of the degree of congestion. When the degree of congestion is higher than the upper limit, it is determined that the area around a concerned hub is crowded. The destination specification unit 13 specifies the hubs a to e in areas where the degree of congestion is equal to or less than the threshold for the degree of congestion. Then, the destination specification unit 13 sets, as user's destinations, the hubs a to e that are closet to the location of the user who desires the experience. The destination is a destination to which the user who desires the experience is headed, and is also a place where the user has the experience (a provision place where the experience can be provided). In the example of FIGS. 2 and 3, it is assumed that the user location of User A is "City p" and hubs a and d are located within the area of City p. The provider capable of providing the experience that User A desires is Store 1. The product serviceable hubs of Store 1 are a, b, and c. The hubs b and c are not included in the area of City p, and the hub a is included in the area of City p. Therefore, the destination specification unit 13 specifies the hub a as a destination corresponding to the provider "Store 1" of the experience that User A desires. Further, the destination specification unit 13 causes the database 16 to store the specified hub in association with information of the user who is scheduled to arrive, for each of the hubs a to e.

The movement plan generation unit 14 generates a movement plan for moving to the destination based on the map information. The movement plan includes route information for moving from the user's current location to the destination specified by the destination specification unit 13, fees required to reach the destination, or the movement time. The movement plan includes at least route information, but the route information is not always required to be represented by a route on a map, and may include minimum information such as train boarding and alighting stations required for the user to move. Further, the movement plan includes a traveling route by vehicle, a movement route using a train, a walking route, or the like.

The vehicle dispatch unit 15 dispatches vehicles arriving at destinations to providers. When the supply style of a provider specified by the provider specification unit 12 is home delivery, it is necessary to transport products or the like from stores to destinations. In such a case, the vehicle dispatch unit 15 arranges vehicles for home delivery in accordance with user's arrival at the destinations. The vehicle dispatch unit 15 transmits vehicle dispatch information to the provider 4.

The database 16 stores, as a table, user's experience desire data and provider data. The database 16 also stores the map information and the like. The provider table in the database 16 stores at least provider's identification information and product serviceable hubs (provision places where experiences can be provided) while associating one another. The provider's identification information is indicated by the store name, ID, or the like, as illustrated in FIG. 3. The product serviceable hubs represent locations of candidates for destinations of users who desire experiences. That is, the provider table stores data of user's destination locations and the provider data while associating one another. Further, the database 16 also stores usage history of users and providers.

The transmission unit 17 is connected, via the network 3, to the user terminal devices 2 and the terminals of the providers 4. The transmission unit 17 transmits a notification signal relating to the experience to the providers. The notification signal is a signal for notifying that the user desires an experience to be provided at the destination indicated by the movement plan. By receiving this notification signal, the providers can confirm that there is a business opportunity in the hub. Further, the transmission unit 17 transmits data including the movement plan and information on providable experiences to the terminal device 2 of users who desires the experiences. Since the experience content and destination specified by the server may not match user's desires, information on the experience content and destination is sent to the user in advance.

The reception unit 18 is connected, via the network 3, to the user terminal devices 2 and the terminals of the providers 4. The reception unit 18 receives data transmitted from the terminal devices 2 and data transmitted from the terminals of the providers 4.

Figure 5:
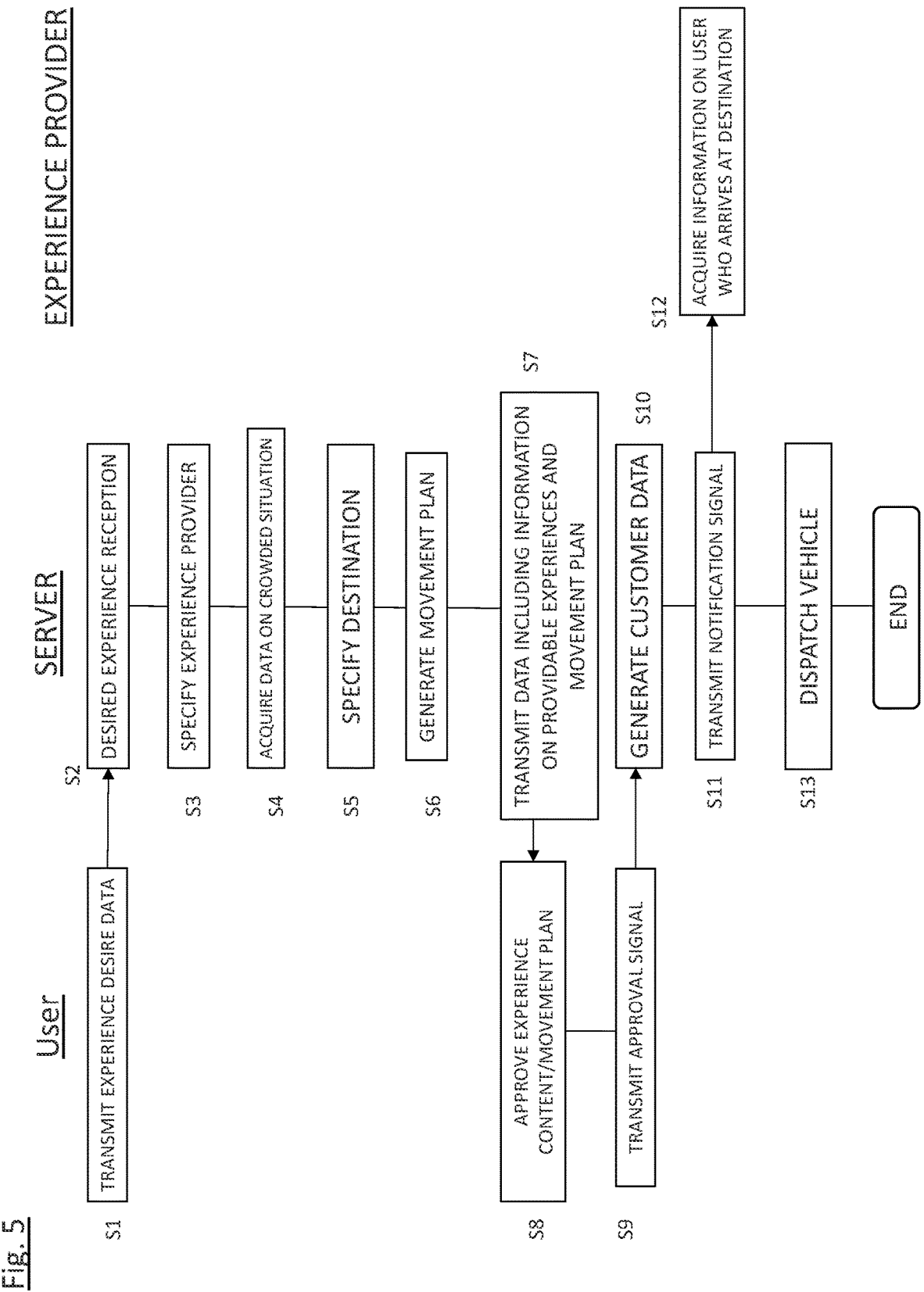
FIG. 5 is a flowchart illustrating an information processing procedure that can be executed by the information processing system of FIG. 1.

Next, an outline of an information processing procedure that can be executed by the system of the present embodiment will be described. FIG. 5 is a flowchart illustrating the information processing procedure.

First, in step S1, when a user accesses the server 1 using the terminal device 2, the user's terminal device 2 displays a screen where desired content, user location, desired experience time zone, number of persons, budget, and the like can be entered, as information about the above-described desired experience. The user enters information about the desired experience for each item. Further, a location detection sensor of the GPS receiver provided in the terminal device 2 detects the latitude and longitude. This locational information is transmitted to the server 1 together with the information about the desired experience.

In step S2, the desired experience reception unit 11 of the server 1 receives, via the network 3, the above-described information transmitted from the terminal device 2 carried by respective users, at predetermined time intervals (e.g., 100 msec). The experience desire data transmitted from the terminal device 2 includes information about the desired experience, as illustrated in FIG. 2, in addition to the ID of the user owning the terminal device 2. The desired experience reception unit 11 stores the acquired experience desire data in the database 16.

In step S3, the provider specification unit 12 of the server 1 refers to the data stored in the database 16, and specifies an experience provider based on the provider data and the experience desire data. The provider data is data stored in the provider table. The experience desire data is data acquired from the terminal device 2 by the desired experience reception unit 11. Further, the provider specification unit 12 specifies the content of the experience that the user desires from the experience desire data. The content of the experience corresponds to information about the genre and main menu of the provider table. The provider specification unit 12 specifies, as the experience provider, a provider corresponding to the specified content of the experience in the provider table stored in the database 16.

In step S4, the destination specification unit 13 of the server 1 acquires data on crowded situation around the hubs. The data on crowded situation is data to be used for calculating the degree of congestion around the hubs a to e, and includes traffic information in traffic communication systems, information in private-sector locational information management systems, or the like.

In step S5, the destination specification unit 13 of the server 1 refers to the data stored in the database 16, and specifies a destination corresponding to the experience provider and the provision place. Further, the destination specification unit 13 uses the data on crowded situation acquired in step S4 to specify a non-crowded place as the destination. In step S6, the movement plan generation unit 14 generates a movement plan for the user to move to the destination specified by the destination specification unit 13.

In step S7, the transmission unit 17 transmits, to the user's terminal device 2, data including information on the providable experience and the movement plan. In step S8, the terminal device 2 displays the received data on its display, and displays a screen for selecting approval or denial with respect to the destination and the experience content specified by the server 1. If the user selects denial, a denial signal indicating denial is transmitted from the terminal device 2 to the server 1. The server 1 terminates the flow of the information processing illustrated in FIG. 5. If user selects approval, the movement plan is finalized, then in step S9, the terminal device 2 transmits an approval signal to the server 1.

In step S10, the provider specification unit 12 generates customer data after receiving the approval signal. FIG. 6 illustrates customer data generated by the provider specification unit 12. The customer data includes information on users who aggregate to the destination. The destination is indicated by the finalized movement plan. As illustrated in FIG. 6, the customer data includes information such as identification information of the hub serving as the destination, number of users, age group of users, time of stay of users, preferences of main user, desired product, and budget of main user. For example, if there is any user who has the same preferences as User A of FIG. 2 and desires the same experience as User A, a provider capable of providing the same experience as User A's experience is specified as an experience provider for the latter user. Then, the provider specification unit 12 causes the database 16 to store information on another user scheduled to arrive at the hub a in association with the hub a. Further, when the information of multiple users is stored in the database 16 in association with the hub a, the provider specification unit 12 aggregates attributes of the users in the database 16. The customer data illustrated in FIG. 6 indicates aggregated user attributes. That is, as illustrated in FIG. 6, around 10 to 20 users including User A gather at the hub a, and the users who gather at the hub a have common attributes as illustrated in the table of FIG. 6.

In step S11, the transmission unit 17 transmits a notification signal to the terminal of the provider 4. The notification signal includes the customer data of FIG. 6. In step S12, the provider 4 receives the notification signal and acquires information of the user who arrives at the destination. In the example of FIG. 6, the provider 4 can acquire information indicating that the user will arrive at the hub a, and attribute information of the user scheduled to arrive at the hub a. Since the provider 4 can confirm, from the user attributes included in the notification signal, the number of persons who will arrive at the hub a, desired products, user's preferences, and the like, the provider 4 can prepare products suitable for the users.

In step S13, vehicle dispatch unit 15 dispatches a vehicle arriving at the destination for the provider. Then, the server 1 terminates the flow of the information processing illustrated in FIG. 5.

As described above, according to the information processing system of the present embodiment, the server 1 includes: the database 16 that stores providers providing users with experiences and provision places where the providers can provide the experiences while associating one another; the desired experience reception unit 11 configured to acquire experience desire data relating to an experience that a user desires; the specification unit configured to specify, based on the data stored in the database 16 and the experience desire data, an experience provider indicating a provider capable of providing the experience that the user desires; the movement plan unit configured to specify the provision place specified by the specification unit as a user's destination and generate a movement plan for the user to move to the destination; and the transmission unit 17 configured to transmit, to the experience provider, a notification signal notifying that the user desires the experience to be provided at the destination indicated in the movement plan. This makes it possible to provide the experience desired by the user at the destination, which is a place other than the store. Further, when multiple providers 4 are aggregated at the destination, the user can have multiple experiences at one destination.

Further, according to the information processing system of the present embodiment, the specification unit sets the destination in an area where the degree of congestion is equal to or less than a predetermined value. This makes it possible to set experience provision places in areas with low population and/or vehicle densities while avoiding congested places.

Further, according to the information processing system of the present embodiment, the notification signal includes data indicating attributes of the user. This enables the provider 4 to prepare products or services according to the attributes of the user arriving at the destination. Further, the provider 4 can grasp user's aggregated desire information such as time, budget, preferences, number of persons, it is possible to provide products or services that meet the user's desire.

Further, according to the information processing system of the present embodiment, the transmission unit 17 transmits a signal including information indicating the movement plan to the user. This makes it possible to match the provider 4 who provides experiences with the user.

Further, according to the information processing system of the present embodiment, the transmission unit 17 transmits a signal including information indicating the movement plan to the provider 4. This makes it possible to match the provider 4 who provides experiences with the user.

Further, according to the information processing system of the present embodiment, the server 1 includes the vehicle dispatch unit 15 configured to dispatch a vehicle moving to the destination for the provider. This enables the provider 4 to increase opportunities of providing products to the destination.

Further, according to the information processing system of the present embodiment, the movement plan may be a plan using a vehicle to move. This enables users to use vehicles to go to destinations.

Further, as a modified example of the present embodiment, the reception unit 18 may receive preparation status data indicating the preparation status of the experience from the provider 4, and the transmission unit 17 may transmit the preparation status data to the terminal device 2. For example, when the experience relates to eating and drinking, data indicating the status of the food and drink prepared corresponds to the preparation status data. The preparation status data is, for example, represented by the waiting time until the product is completed. By acquiring the preparation status data, users can confirm remaining time until the provision of the product.

Further, as a modified example of the present embodiment, the notification signal may include information on arrival time when the user arrives the destination. The provider 4 can confirm the time when the user arrives at the hub a, from the user's arrival time included in the notification signal. In the customer data illustrated in FIG. 6, the time at which the user stay time starts corresponds to the user's arrival time. In the example of FIG. 6, it is 11:00. The example of FIG. 6 shows aggregated data of information when the number of users is 10 to 20 persons. However, the customer data may include, as the user's arrival time, the time when each user arrives at the hub a. The provider 4 receiving the notification signal can confirm each user's arrival time, from the user's arrival time information included in the notification signal, and can prepare the product according to the user's arrival.

Further, as a modified example of the present embodiment, the transmission unit 17 may transmit the notification signal to the provider 4 a predetermined time before the user's arrival time. The predetermined time is set according to preparation time for the provider to provide the experience. The preparation time is entered by a user of the provider at the time of initial registration, or may be set according to the genre of the provider. For example, when time from the reception of the notification signal to the provision of the product at the provision place is set to 8 hours and the user's arrival at the provision place is 17:00, the transmission unit 17 transmits the notification signal at 9:00. The provider 4 that has received the notification signal can prepare the product in time for the user's arrival time (17:00). The preparation time may include the time required for the provider 4 to move to the provision place, or may include the time required to deliver the product from the provider 4 to the provision place.

The information processing procedure executed in the system of the present embodiment is not always required to be in the order indicated in FIG. 5, and may be replaced as appropriate. For example, the destination specification unit 13 specifies the destination that may serve as the experience provision place from user's locational information included in the experience desire data. The provider specification unit 12 specifies a provider capable of providing an experience that the user can desire from among providers around the specified destination. Further, respective steps of the control flow may be arranged into a single step by combining a plurality steps. For example, the step of specifying the experience provider and the step of specifying the destination may be replaced by a single step of specifying both the provider and the destination. Further, it is not necessary to execute all the steps illustrated in FIG. 5. For example, the control flow of steps S4 and S13 may be omitted.

The desired experience reception unit 11 corresponds to the "acquisition unit" according to the present invention. The provider specification unit 12 corresponds to the "specification unit" according to the present invention. The destination specification unit 13 and the movement plan generation unit 14 correspond to the "movement plan unit" according to the present invention.

DESCRIPTION OF REFERENCE NUMERALS

1: server
2: user terminal device (terminal device)
3: network
4: provider
11: desired experience reception unit
12: provider specification unit
13: destination specification unit
14: movement plan generation unit
15: vehicle dispatch unit
16: database
17: transmission unit
18: reception unit

The invention claimed is:

1. An information processing system comprising:
a database that stores a provider data table and a user table, wherein the provider data table includes providers providing experiences and, for each provider in the provider data table, at least one hub where each hub is a place away from areas of high degree of congestion and has a large space;
a plurality of user terminal devices each comprising a location detection sensor including a GPS receiver; and
a server connected by a wireless network with the plurality of user terminal devices and a plurality of experience providers and further configured to acquire and store data from and to the database;
the server configured to:
  acquire experience desire data from a first user terminal device of the plurality of user terminal devices relating to an experience that a first user desires and store the experience desire data of the first user in the user table;
  determine a location of the first user using the location detection sensor of the first user terminal device;
  determine, based on the provider data table, the location of the first user, and the user table including the experience desire data, a first experience provider being a provider capable of providing the experience that the first user desires at one or more hubs associated with the first experience provider by the provider data table;
  receive congestion information from a traffic communication system for each of the one or more hubs;
  calculate a degree of people gathering congestion for each of the one or more hubs based on the congestion information;
  determine a destination of the first user and generate a movement plan for the first user to move to the destination, wherein the destination is set to a hub of the one or more hubs where the degree of people gathering congestion is equal to or less than a predetermined threshold;
  transmit, to the first user terminal device, the movement plan;
  receive, from the first user terminal device, an indication of whether the first user approves the movement plan;
  transmit, to the first experience provider, a notification signal notifying that the experience is desired to be provided at the destination in response to receiving approval of the movement plan; and generate and transmit customer data to, at least, the first experience provider in response to receiving approval of the movement plan, wherein the customer data comprises information of a plurality of the users that aggregate to the destination.

2. The information processing system according to claim 1, wherein the experience desired by the first user is a purchase of product by the first user and/or a service experienced by the first user.

3. The information processing system according to claim 1, wherein the notification signal includes data indicating an attribute of the first user.

4. The information processing system according to claim 1, wherein the notification signal includes the movement plan.

5. The information processing system according to according to claim 1, wherein the server is further configured to dispatch a vehicle moving to the destination for the first experience provider in response to receiving acceptance of the movement plan.

6. The information processing system according to claim 1, wherein the server is further configured to:

receive, from the first experience provider, preparation status data indicating a state of preparation of the experience to be provided to the first user, and transmit the preparation status data to the first user terminal device.

7. The information processing system according to claim 1, wherein the movement plan is a plan using a vehicle to move.

8. The information processing system according to claim 1, wherein the notification signal includes information of arrival time when the first user arrives at the destination.

9. The information processing system according to claim 8, wherein the server transmits the notification signal to the first experience provider a predetermined time before the arrival time, and the predetermined time is set according to a preparation time for the first experience provider to provide the experience.

10. An information processing method for processing information about user-desired experiences on a server, the method comprising:

acquiring data from a database that stores a provider data table and a user table, wherein the provider data table includes providers providing users with experiences and, for each provider in the provider data table, at least one hub where each hub is a place away from areas of high degree of congestion and has a large space, wherein the server is configured to acquire and store data from and to the database;

acquiring, over a wireless network, experience desire data from a first user terminal device relating to an experience that a first user desires and store the experience desire data of the first user in the user table, wherein the first user terminal device comprises a location detection sensor including a GPS receiver;

determining a location of the first user using the location detection sensor of the first user terminal device;

determining, based on the provider data table, the location of the first user, and the user table including the experience desire data, a first experience provider being a provider capable of providing the experience that the first user desires at one or more hubs associated with the first experience provider by the provider data table;

receiving congestion information, over the wireless network, from a traffic communication system for each of the one or more hubs;

calculating a degree of people gathering congestion for each of the one or more hubs based on the congestion information;

determining a destination of the first user and generating a movement plan for the first user to move to the destination, wherein the destination is set to a hub of the one or more hubs where the degree of people gathering congestion is equal to or less than a predetermined threshold;

transmitting, to the first user terminal device, the movement plan;

receiving, from the first user terminal device, an indication of whether the first user approves the movement plan;

generating customer data including information of a plurality of the users that desire the same experience and aggregate to the destination; and transmitting, to the first experience provider, a notification signal notifying that the experience is desired to be provided at the destination in response to receiving approval of the movement plan, the notification signal including the customer data.

11. The information processing system of claim 1, wherein the location comprises a latitude and longitude determined by the first user terminal device.

12. The information processing system of claim 1, wherein:

the destination is an aggregate place where users with similar experience desire data aggregate.

13. The information processing system of claim 1, wherein the congestion information comprises one or more of:

traffic data comprising real-time traffic density, social network data comprising a number of communications associated with each hub, and geographical data comprising a distance from a downtown terminal for each hub.

* * * * *